(12) United States Patent
Yasukawa et al.

(10) Patent No.: US 11,184,753 B2
(45) Date of Patent: Nov. 23, 2021

(54) APPARATUS, METHOD AND PROGRAM FOR TRANSMITTING AND RECEIVING DATA TO AND FROM IOT DEVICE

(71) Applicant: SORACOM, INC., Setagaya-ku (JP)

(72) Inventors: Kenta Yasukawa, Tokyo (JP); Takashi Oguma, Tokyo (JP)

(73) Assignee: SORACOM, INC., Tokyo (JP)

( * ) Notice: Subject to any disclaimer, the term of this patent is extended or adjusted under 35 U.S.C. 154(b) by 0 days.

(21) Appl. No.: 16/755,097

(22) PCT Filed: Oct. 10, 2018

(86) PCT No.: PCT/JP2018/037826
§ 371 (c)(1),
(2) Date: Jun. 9, 2020

(87) PCT Pub. No.: WO2019/074032
PCT Pub. Date: Apr. 18, 2019

(65) Prior Publication Data
US 2020/0304973 A1    Sep. 24, 2020

(30) Foreign Application Priority Data

Oct. 10, 2017 (JP) .............................. JP2017-197278

(51) Int. Cl.
*H04W 4/70* (2018.01)
*H04L 29/12* (2006.01)
(Continued)

(52) U.S. Cl.
CPC ........... *H04W 4/70* (2018.02); *H04L 61/6072* (2013.01); *H04L 67/2823* (2013.01); *H04W 4/14* (2013.01);
(Continued)

(58) Field of Classification Search
CPC ......... H04W 4/70; H04W 4/14; H04W 80/10; H04W 76/11; H04W 8/24; H04W 60/04;
(Continued)

(56) References Cited

U.S. PATENT DOCUMENTS

| | | | | |
|---|---|---|---|---|
| 6,058,169 A | * | 5/2000 | Bramnick | .......... H04N 1/00209 358/407 |
| 2005/0003838 A1 | * | 1/2005 | McCann | ............. H04W 88/184 455/466 |

(Continued)

FOREIGN PATENT DOCUMENTS

| | | |
|---|---|---|
| CN | 101094200 | 12/2007 |
| GB | 2530552 | 3/2016 |

(Continued)

OTHER PUBLICATIONS

IoT Device Connection Efficiency Guidelines Version 2.0 by GSM Association, dated Jul. 1, 2015 (Year: 2015).*

(Continued)

*Primary Examiner* — Daniel Lai
(74) *Attorney, Agent, or Firm* — Cozen O'Connor (57) ABSTRACT

An apparatus for transmitting and receiving data to/from an IoT device to accelerate the spread of IoT. The IoT device 110 generates a message to be transmitted, and transmits, via SMS, the message to the phone number of a first server 101, which is stored in the IoT device 110. The first server 101 notifies the IoT terminal 110, as needed, of having received SMS data including the message, and thereafter delivers the SMS data to a second server 102. The second server 102 specifies a destination with reference to associations between destination identifiers includable in the SMS data and destinations. The second server 102 transmits, to a third external server 123, a portion obtained by excluding the (Continued)

destination identifier from the message or the whole message including the destination identifier.

7 Claims, 4 Drawing Sheets

(51) Int. Cl.
*H04L 29/08* (2006.01)
*H04W 4/14* (2009.01)
*H04W 88/16* (2009.01)
*H04W 88/18* (2009.01)
*H04W 52/02* (2009.01)
*H04W 68/02* (2009.01)

(52) U.S. Cl.
CPC ............ *H04W 52/02* (2013.01); *H04W 68/02* (2013.01); *H04W 88/16* (2013.01); *H04W 88/184* (2013.01)

(58) Field of Classification Search
CPC ....... H04W 4/12; H04W 24/02; H04W 88/16; H04W 88/184; H04W 4/38; H04W 88/18; H04W 68/02; H04W 68/005; H04W 52/0216; H04W 52/0229; H04W 52/0235; H04W 68/025; H04W 52/0219; H04W 68/00; H04W 52/02; H04W 52/0261; H04W 68/04; H04W 68/06; H04W 52/0206; H04W 52/0212; H04W 52/0225; H04W 52/0238; H04W 52/0248; H04W 52/0258; H04W 52/0264; H04W 52/028; H04W 52/34; H04L 67/12; H04L 65/1016; H04L 65/1069; H04L 27/2613; H04L 51/18; H04L 51/38; H04L 61/6054; H04L 65/1006; H04L 61/6072; H04L 67/2823; G06F 1/3206; G06Q 20/3827; H04M 3/00; H04M 11/00
See application file for complete search history.

(56) References Cited

U.S. PATENT DOCUMENTS

| | | | | |
|---|---|---|---|---|
| 2007/0298817 | A1* | 12/2007 | Alfano ................ | H04L 65/1006 455/466 |
| 2009/0047967 | A1* | 2/2009 | Zhu ...................... | H04L 51/14 455/445 |
| 2009/0252159 | A1 | 10/2009 | Lawson et al. | |
| 2010/0191602 | A1* | 7/2010 | Mikkelsen ............. | H04L 69/04 705/14.64 |
| 2011/0074596 | A1 | 3/2011 | Frohlick et al. | |
| 2012/0016942 | A1 | 1/2012 | Cherian et al. | |
| 2013/0109416 | A1* | 5/2013 | Tang ..................... | H04W 4/14 455/466 |
| 2014/0074946 | A1 | 3/2014 | Dirstine | |
| 2016/0164824 | A1* | 6/2016 | Kalyanaraman ........ | H04W 4/14 709/206 |
| 2017/0064487 | A1* | 3/2017 | Buckley ................. | H04W 4/70 |
| 2017/0339538 | A1* | 11/2017 | Yang .................... | H04L 65/1006 |
| 2018/0206093 | A1* | 7/2018 | Jain ...................... | H04W 92/00 |
| 2020/0029302 | A1* | 1/2020 | Cox .................. | H04W 56/0015 |

FOREIGN PATENT DOCUMENTS

| | | |
|---|---|---|
| JP | 2008-165336 | 7/2008 |
| JP | 2012-503363 | 2/2012 |
| JP | 2012-114924 | 6/2012 |
| JP | 2013-503590 | 1/2013 |
| JP | 2013-192017 | 9/2013 |
| JP | 2016-027612 | 2/2016 |
| WO | WO 2017/090306 | 6/2017 |

OTHER PUBLICATIONS

"Device: Inactive Trigger Node" by Losant (retrieved from https://docs.losant.com/workflows/triggers/on-inactivity/on Jul. 17, 2021) (Year: 2021).*
International Search Report issued in corresponding PCT Application No. PCT/JP2018/037826.
Written Opinion issued in corresponding PCT Application No. PCT/JP2018/037826.
Office Action dated Oct. 5, 2018 issued in Japanese Patent Application No. 2018-130304.
Office Action dated Dec. 26, 2018 issued in Japanese Patent Application No. 2018-130304.

* cited by examiner

FIG.1

APPARATUS, METHOD AND PROGRAM FOR TRANSMITTING AND RECEIVING DATA TO AND FROM IOT DEVICE

RELATED APPLICATIONS

This is a U.S. National Phase Application under 35 USC 371 of International Application PCT/JP2018/037826 filed on Oct. 10, 2018.

This application claims the priority of Japanese application no. 2017-197278 filed Oct. 10, 2017, the entire content of which is hereby incorporated by reference.

TECHNICAL FIELD

The present invention relates to an apparatus, a method, and a program for transmitting and receiving data to and from an IoT device.

BACKGROUND ART

With advances in sensing and communication technologies, the number of devices connected to computer networks has increased, and the idea of the Internet of Things, in which everything is networked, has become widespread. Hereinafter, a networked device, not limited to the Internet, is referred to as an "IoT device".

IoT devices can connect to a network to transmit collected data to a server, storage, etc., or receive data distribution from a server, but in order to do so, a secure connection must be established between the server. One method is to provide both the server and the device with the same or corresponding authentication information in advance for communication using a predetermined communication protocol, and for example, the software running when the device is turned on may use the authentication information to establish a connection between the server and the device.

When an IoT device in which a SIM card is inserted turns on, the IoT device is attached to a cellular network through authentication of the IMSI written in the SIM card by an HLR/HSS. After being attached to the cellular network, an additional GTP connection is made when data communication through packet switching is performed, and data can be transmitted and received through IP communication with the server.

SUMMARY OF INVENTION

Technical Problem

Figure 1:
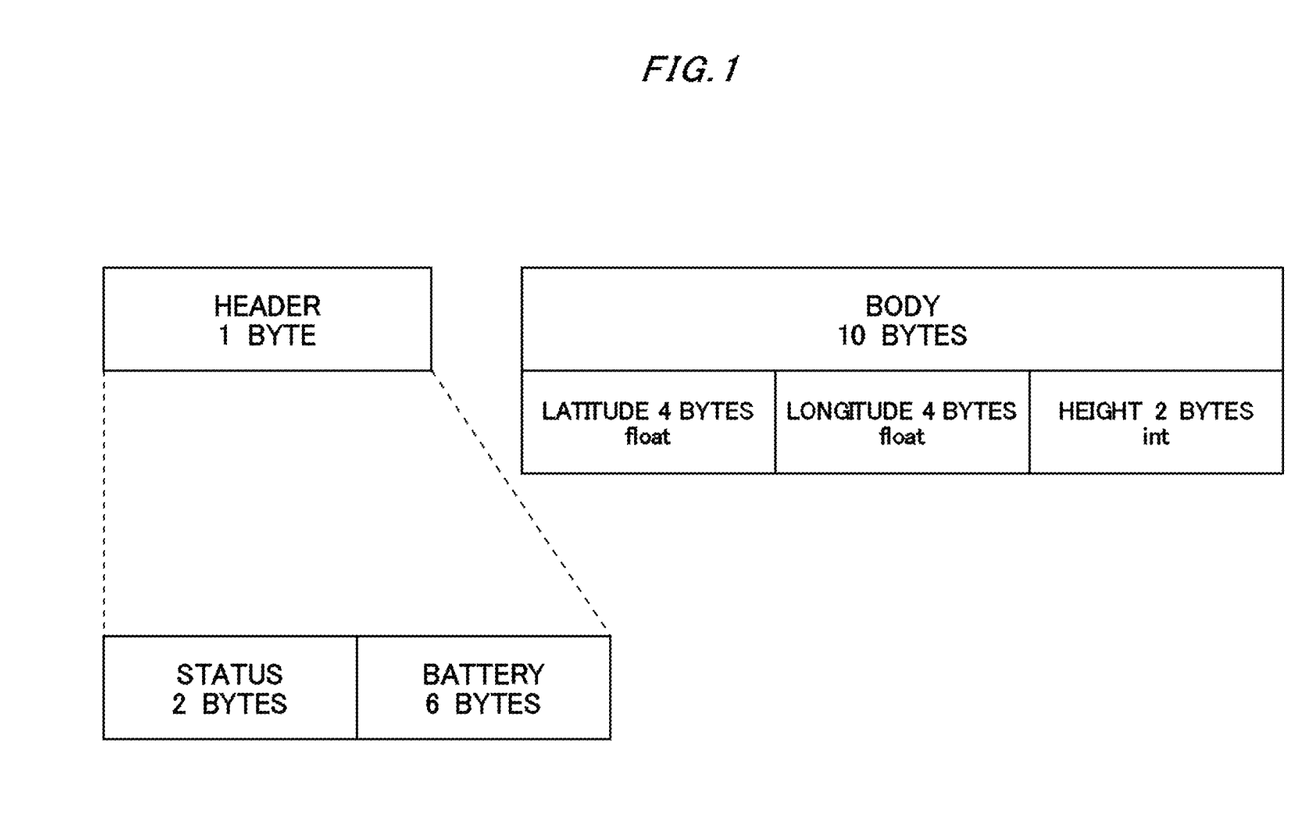
FIG. 1 is a figure showing an example of a log data by GPS tracking.

However, the above-mentioned communication protocol generates a large overhead for the data to be transmitted or received. As an example, if we consider transmitting 11 octets of log data from an IoT device capable of GPS tracking to a server, as shown in FIG. 1, we need to process hundreds of octets of data for establishing a GTP connection, establishing a TCP socket, making an HTTP POST request, receiving an HTTP POST response, disconnecting a TCP socket, and then disconnecting the GTP connection. This overhead is directly related to power consumption in the IoT device and has a significant impact on continuous uptime.

The present invention was made in view of such a problem, and the objective of the invention is to reduce the overhead in an apparatus, method, and program for transmitting or receiving data to or from an IoT device in order to accelerate the spread of the IoT.

Solution to Problem

To achieve the objective, the first aspect of the present invention is an apparatus for transmitting or receiving data with an IoT device, comprising a first server for receiving SMS data including a message from the IoT device, and a second server for identifying a destination for the message or corresponding data based on the SMS data, wherein the second server communicates with the destination over an IP network.

In the second aspect of the present invention according to the first aspect, the destination is identified by referring to a correspondence between destination identifiers includable in the SMS data and destinations.

In a third aspect of the present invention according to the second aspect, the destination identifier is included in the SMS data as a part of a message.

In the fourth aspect of the invention according to the third aspect, the destination identifier is a numeral or a symbol with predetermined digits or digits less than the predetermined digits.

In the fifth aspect of the invention according to any of the first to fourth aspects, the message is in binary format.

In the sixth aspect of the present invention according to the fifth aspect, the second server decompresses the SMS message into text format before transmitting it to the destination.

In the seventh aspect of the present invention according to any of the first to sixth aspects, the second server receives from an external server data in which an instruction to the IoT device is expressed by communication over an IP network, and provides the data to the first server, wherein the first server transmits an SMS data including the data or corresponding data in a message to the IoT device, and wherein the first server has not received data from the IoT device for a predetermined time or more when transmitting the SMS data.

The eighth aspect of the present invention is an apparatus for transmitting or receiving data to or from an IoT device, comprising a first server for receiving signaling data including a message from the IoT device by signaling over a cellular network, and a second server for identifying a destination of the message or data corresponding thereto based on the signaling data, wherein the second server communicates with the destination over an IP network.

The ninth aspect of the present invention is a method for transmitting or receiving data to or from an IoT device, comprising steps of receiving signaling data including a message from the IoT device by signaling over a cellular network, and identifying a destination of the message or data corresponding thereto based on the signaling data, wherein the transmission to the destination is performed over an IP network.

The tenth aspect of the present invention is a program for having a computer to execute a method for transmitting or receiving data to or from an IoT device, wherein the method includes steps of receiving signaling data including a message from the IoT device by signaling over a cellular network, and identifying a destination of the message or corresponding data based on the signaling data, wherein the transmission to the destination is performed over an IP network.

Advantageous Effect of the Invention

To achieve the objective, according to one aspect of the present invention, when SMS which has limitation in its capacity is used for communication between an IoT device and an external server, instead of describing the destination such as the URL of the external server as it is in the SMS data, a numeral or a symbol with a predetermined digits or digits less than the predetermined digits is introduced as a destination identifier. By converting the identifier into a destination at the receiving end of the SMS data, significant reduction in overhead is achieved without compromising the collaboration with various external services.

DESCRIPTION OF EMBODIMENTS

The embodiments of the present invention will be described in detail with reference to the drawings below.

First Embodiment

Figure 2:
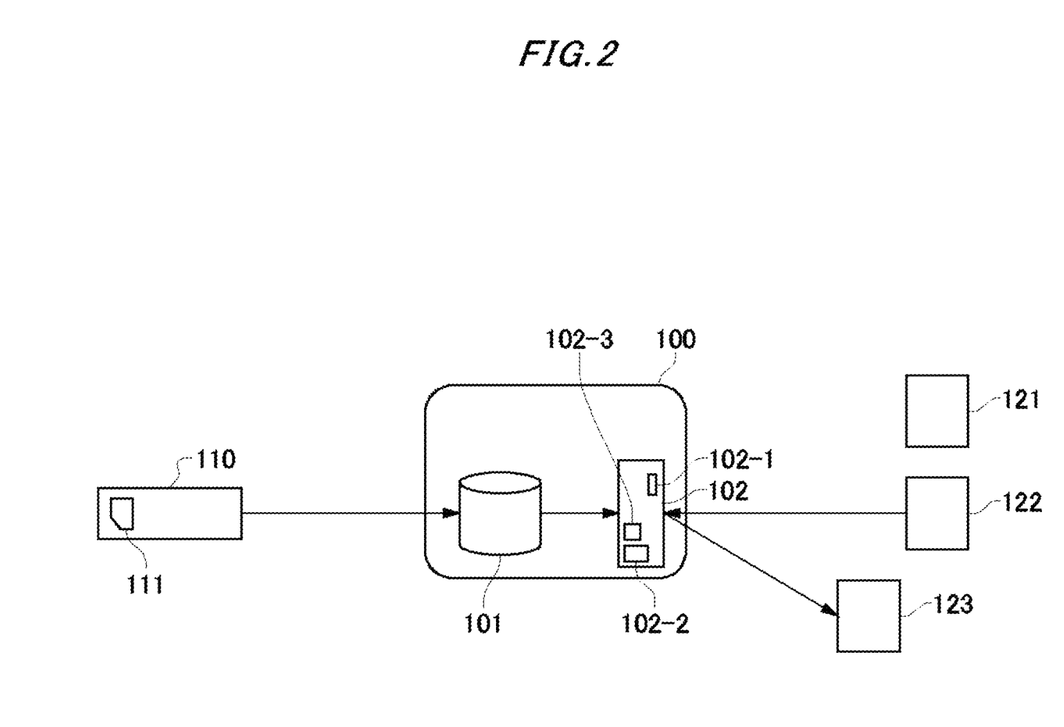
FIG. 2 is a diagram showing an apparatus according to the first embodiment of the present invention.

FIG. 2 shows an apparatus according to the first embodiment of the present invention. When a SIM card 111 is inserted in the IoT device 110, the inventors have found that SMS, rather than IP communication which has a large overhead, can be used to significantly reduce an overhead while performing complex processing as IP communication.

The device 100 comprises a first server 101 that receives SMS data from the IoT device 110 in which the SIM card 111 is inserted, and a second server 102 that identifies a destination of a message included in the SMS data or data corresponding to the message or data based on the SMS data. The destination can be an external server that provides a variety of services, making it possible to realize complex processing. In FIG. 2, the first external server 121, the second external server 122, and the third external server 123 are shown. The communication between the IoT device 110 and the apparatus 100 can be performed by SMS in a cellular network, while the communication between the apparatus 100 and the external server can be an IP communication.

The apparatus 100 can be a communication apparatus of a mobile network operator (MNO), or it can be a communication apparatus of a mobile virtual network operator (MVNO) that is connected to the communication infrastructure of the MNO to provide wireless communication services. Between the MNO and the MVNO, a mobile virtual network enabler (MVNE) that provides support services for the MVNO to conduct its business smoothly may intervene, and the MVNE may have a communication infrastructure for connecting to the communication infrastructure of the MNO to provide wireless communication services. In this case, the apparatus 100 can be a communication apparatus of the MVNE. Also, the first server 101 and the second server 102 of the apparatus 100 may be communication infrastructures of different operators, the first server 101 being a communication apparatus of an MNO and the second server 102 being a communication apparatus of an MVNE or MVNO for example.

The first server 101 is called the SMS center (SMSC) and is a server for transmitting or receiving an SMS message, and the second server 102 receives SMS data including a message as body data from the first server 101, processes the message as necessary, and transmits the data to an appropriate recipient. The first server 101 and the second server 102 may be one or more instances on a public cloud or a private cloud, respectively, and it may be particularly appropriate to design the second server 102 to be divided into multiple instances according to their functions. It is also conceivable that some or all of the functions of the second server 102 may be performed by the first server 101.

As used herein, the term "cloud" refers to a system that can dynamically provision and provide computing resources such as CPU, memory, storage, network bandwidth, and the like over a network on demand. For example, you can use the cloud with AWS. The term "public cloud" refers to a cloud that can be used by multiple tenants.

The IoT device 110 can be any device having the required communication function, and may have an identification number, such as an IMSI, for connecting to a cellular network. A connection to a packet switching network (PS) is required for IP communication in a cellular network, but a connection to a circuit switching network (CS) is sufficient for SMS communication. Therefore, a simplified device without the functions required for connection to the PS can be adopted.

In the present description, we will mainly use an example in which a SIM card is inserted into an IoT device 110, but the identification number, such as an IMSI, can be stored differently than being stored in the physical SIM card 111. One or more IMSI can be stored in a semiconductor chip (also referred to as an "eSIM") embedded in the IoT device 110 or can be stored in a software loaded in the secure area of a module of the IoT device 110. There are various possible ways in which the IoT device 110 may directly or indirectly retain an identification number. In addition to the identification number such as an IMSI, the IoT device 110 stores a telephone number such as its own MSISDN and a telephone number such as the MSISDN of the first server 101, which is an SMSC, in addition to the identification number such as an IMSI.

The first external server 121, the second external server 122, and the third external server 123 may be for various purposes, respectively. For example, it may be used to transmit data via HTTP to the own server of the company operating the IoT device 110, to securely store data via HTTP over SSL/TLS, or to transfer data to an instance or server on the same cloud or a different cloud when the second server 102 is an instance or server on a cloud. The apparatus 100 may retain configuration information such as destination servers, credentials, protocols to be used, and the like for each SIM card, and a mechanism for forwarding data sent by SMS according to the configuration information may be constructed.

Each device described herein is not limited to a single physical device but may be a plurality of mutually accessible devices. As shown in the figure, the second server 102 comprises a communication unit 102-1 such as a communication interface, a processing unit 102-2 such as a processor and a CPU, and a storage unit 102-3 including a storage apparatus or a storage medium such as a memory or a hard disk, and each function can be realized by executing a program for performing each processing stored in the memory unit 102-3 or a memory apparatus or a storage medium accessible from the second server 102 by the processing unit 102-2. Other devices can be realized with the similar hardware. The above program may include one or more programs and may be stored in a computer-readable storage medium to form a non-transitory program product.

Figure 3:
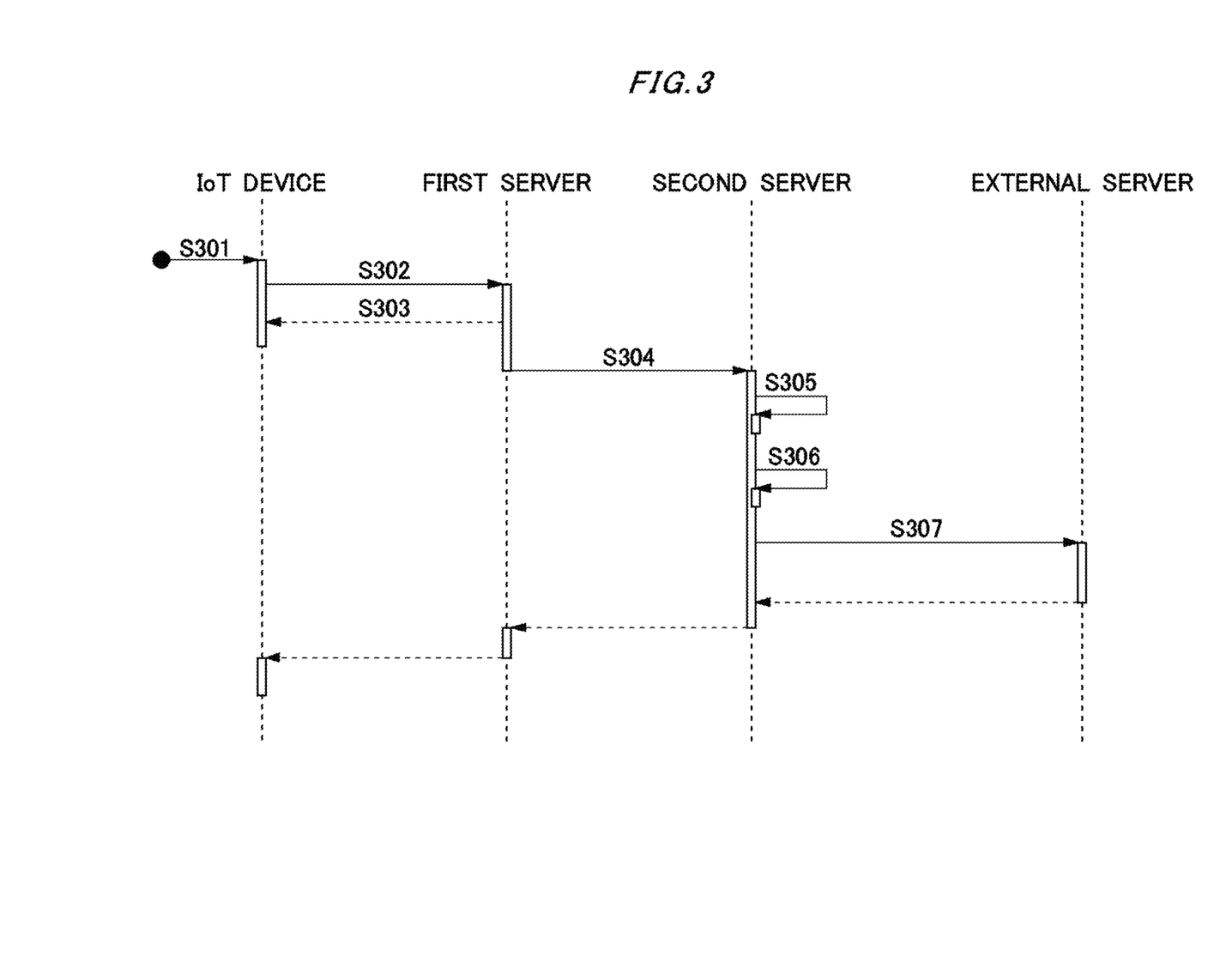
FIG. 3 is a diagram showing a flow of data transmission from an IoT device to an external server according to the first embodiment of the present invention.

FIG. 3 shows a sequence of data transmission from an IoT device to an external server according to the first embodiment of the present invention. First, a kind of an event occurs in the IoT device 110 (S301). For example, the timer may be triggered to transmit the information acquired by the sensor of the IoT device 110 to the third external server 123.

The IoT device 110 generates a message describing the acquired information and transmits it by SMS to the telephone number of the first server 101 stored in the IoT device 110 in advance (S302). The message includes a destination identifier to identify a third external server 123 that is that destination for at least part of the message or data corresponding to the message. The destination identifier can be a four-digit numeral such as 1001, 1002, 1003, 2000, etc., or more generally, a numeral or symbol with predetermined digits or digits less than the predetermined digits. Since the capacity of a message that can be sent by SMS is very limited, such as 140 octets, it is preferable to use binary format.

The first server 101 notifies the IoT terminal 110 as necessary that it has received the SMS data including the message (S303), and then passes the SMS data to the second server 102 (S304). In this case, the identification number stored in the IoT terminal 110 or the telephone number of the IoT terminal 110 which is a sender that can be determined based on the identification number may be included in the SMS data.

The second server 102 identifies the destination by referring to the correspondence between destination identifiers includable in an SMS data and destinations based on the destination identifier included in the message of the SMS data (S305). The destination can be a URL on an IP network, which is often several tens of octets. If the message is in binary format, the second server 102 may decompress the message into text-based format, such as JSON, XML, etc., which is generally used on the server side, so that it can be easily handled by the destination third server 123 (S306).

The second server 102 transmits the part of the message excluding the destination identifier or the entire message including the destination identifier to the third external server 123 (S307). As an example, at least part of the message or the corresponding data can be sent by an HTTP POST request in JSON format or the like.

Each apparatus may be inactive when it receives a result for a transmission that it has made, or when a transmission is made, as shown by the dotted line in FIG. 3. The period during which each apparatus is active is shown as a vertical rectangle.

It is unrealistic to use SMS, which is limited in capacity, for communication between IoT devices and an external server because the destination, such as the URL of the external server, takes up a large percentage of the capacity. By introducing a numerical or symbolic with predetermined digits or digits less than the predetermined digits as a destination identifier and converting the identifier into a destination on the receiving side of SMS data, SMS communication can be realistically realized, and a significant reduction in an overhead can be achieved without compromising collaboration with various external services. Also, when the server side is open to the public, it is generally necessary to request a credential for authentication from the client for security reasons, and there is an overhead when this information is also transmitted via SMS. In this embodiment, this information can be removed by retaining it on the server side and applying it appropriately. For this purpose, a correspondence between destination or destination identifiers and credentials may be retained at the apparatus 100.

In the above explanation, the identification of a destination is based on the destination identifier; however, in addition to or in lieu of the destination identifier, the identification of a destination may be based on the telephone number of the sender included or added in or to the SMS data or at least part of the message in the SMS data.

Moreover, in the present embodiment, data transmission from the IoT device 110 to the apparatus 100 or the first server 101 is performed by SMS over the cellular network, but this does not necessarily limit the spirit of the present invention to SMS only, and signaling over the cellular network other than SMS may be employed. In this case, the data received by the first server 101 is called "signaling data," and more specifically, it can be defined as data that can be transmitted from the client and can uniquely and securely identify the identification number used for the transmission on the receiving server side. For example, the signaling data may include a message using USSD.

It is to be noted that if the term "only" is not written, such as in "only based on x", "in response to x only", or "in the case of x only", in the present specification, it is assumed that additional information may also be considered.

In addition, as a reminder, even if there are aspects of a method, program, terminal, apparatus, server or system (hereinafter referred to as "method, etc.") that perform operations different from those described herein, each aspect of the invention is intended to perform the same operation as one of the operations described herein, and the existence of an operation different from those described herein does not mean that the method, etc. is outside the scope of each aspect of the invention.

Second Embodiment

In the second embodiment, for example, as a premise for transmitting the sensor data exemplified in the first embodiment, an instruction to obtain data, etc., is made from an external server. The data resulting from the operation in accordance with the instruction can be transmitted to an external server in the sequence described in the first embodiment.

Figure 4:
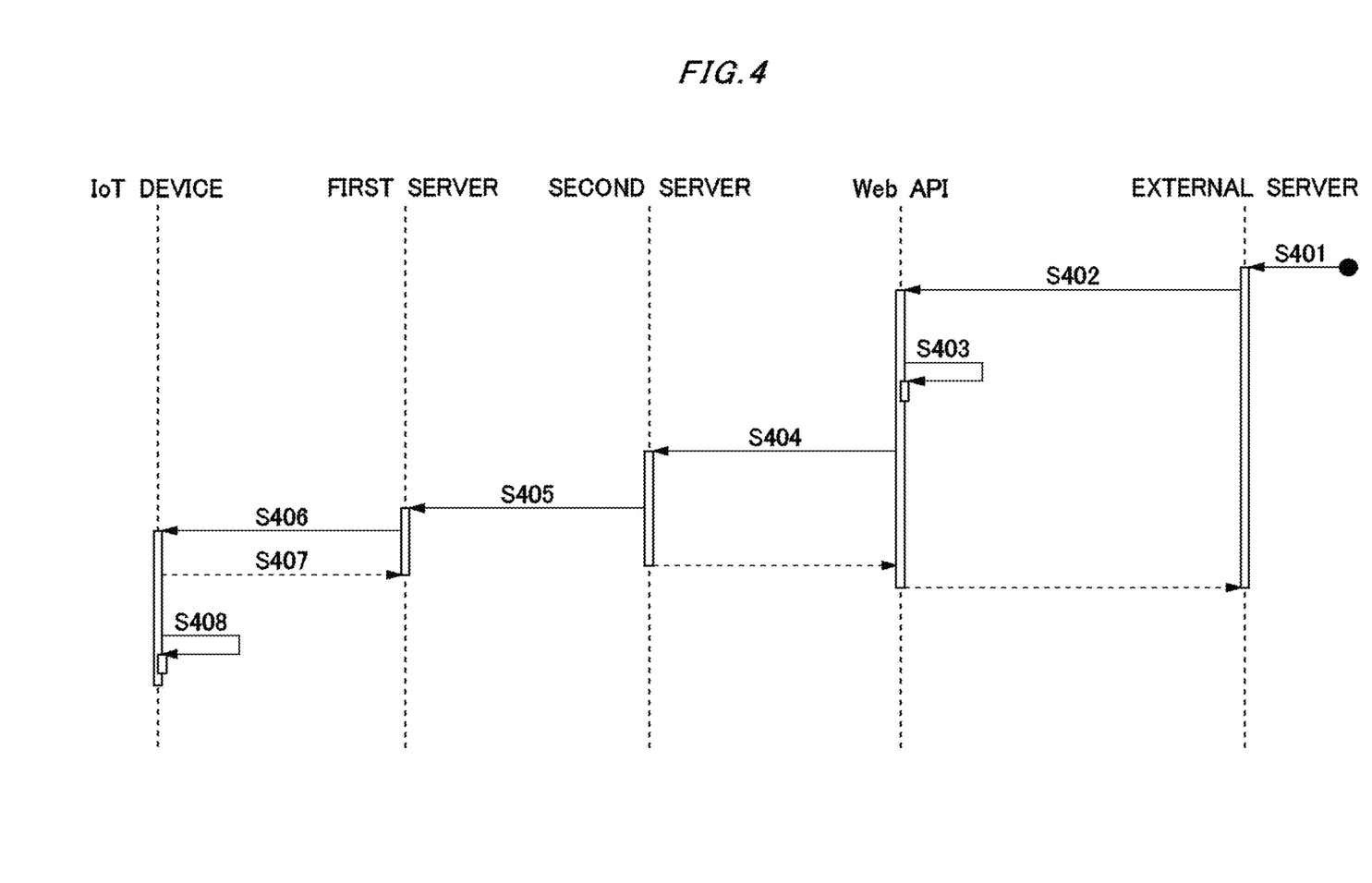
FIG. 4 is a diagram showing a sequence of instruction transmission from an external server to an IoT device according to a second embodiment of the present invention.

FIG. 4 shows a sequence of transmitting an instruction from an external server to an IoT device according to the second embodiment of the present invention. First, a kind of an event occurs at the second external server 122 (S401). For example, an administrator of the IoT device 110 may be concerned about the situation on the terminal side and presses a button to have the IoT device 110 execute a process to obtain sensor data.

The second external server 122 provides an instruction for the IoT device 110 to the Web API (S402), using the device identifier that identifies the IoT device 110 as a parameter and the above instruction as body data. The device identifier may be a telephone number of the IoT device 110, or it may be an identification number such as an IMSI, a device name, or the like.

If the instruction received is in text format, the Web API may convert it to binary format if necessary (S403). Then, if the device identifier is not a telephone number, the Web API identifies the telephone number of the IoT device 110 by referring to the correspondence between device identifiers and telephone numbers, and passes the telephone number of the IoT device 110 and the instruction to the IoT device 110 or the corresponding data to the second server 102 (S404).

Although the server or instance providing the Web API is not shown in FIG. 2, it may be provided separately from the second server 102 or it may be provided by the second server 102. Alternatively, it may be considered a second server 102, including a Web API on a separate server or instance.

The second server 102 transmits a request to the first server 101 to transmit SMS data which uses the telephone number of the IoT device 110 as a destination and received instruction or the corresponding data as a message (S405). In this case, since the source of the SMS data is a telephone number assigned to the first server 101, which is a SMSC, the message may include an external source or an identifier representing the external source that identifies the second external server 122 that made the instruction or the administrator who made the instruction from the second external server 122.

The first server 101 transmits SMS data including data representing the above-mentioned instruction or corresponding data to the IoT device 110 (S406), and the IoT device 110 returns an acknowledgement of receipt if necessary (S407) and executes processes according to the instruction (S408).

In the method of the present embodiment, one feature is that the IoT device is not required to be always online to receive an instruction which may be sent at any time; in the case of IP communication rather than SMS communication, there is generally an intervening device such as a NAT between the server and the IoT device so that the IoT device cannot be accessed directly from the server, and each time a TCP/UDP session is established, state information is created and retained at the server and each device on the path, such as a firewall or NAT, to enable access from the server. And since state information is generally implemented as soft state and has an expiration date, a technique called keepalive is often used which maintains the state information by transmitting empty data from the device before the expiration date. the need for keepalive has been a huge overhead.

In contrast, in communication by SMS, paging can wake-up a modem in dormant mode to signal an incoming message, so that the first server 101 of the present embodiment can transmit SMS data at an arbitrary time to execute instruction without causing the IoT device 110 to periodically or intermittently transmit data. From the perspective of the first server 101, since keepalive is not required, SMS data can be sent even if data from the IoT device 110 has not been received for more than a predetermined duration. For example, in IP communication, it is often difficult to access from the server at an arbitrary time without performing keepalive for more than a few minutes or tens of minutes, but according to the present embodiment, the IoT device 110 does not need to transmit data for such a long duration of time.

More concretely, the data transmission frequency for keepalive is dependent on each expiration date of the state information at each device on the network path, so it cannot be categorically decided. However, it is necessary to set it to the shortest device in order to maintain stable communication, because the setting may change in the network that is not managed by the user. In particular, UDP, which is often used in IoT, often has a shorter timer for maintaining a state than TCP, which is often used in applications with long-lasting sessions, and needs to perform keepalive at a high frequency between tens of seconds and minutes.

As an example, let's consider the case of transmitting a Registration Update request as a keepalive to a server every minute so that data acquisition command from the server can be executed at an arbitrary timing using OMA LWM2M.

Assuming a request size of 80 octets and a response size of 80 octets, the daily communication volume for keepalive would be 230,040 octets, or about 7 MB in a month, which is not a negligible cost for a large number of devices.

In addition, if the device is battery-powered, the device and modem must be always active for this communication to take place, significantly shortening the battery life time. There is a difference of tens or hundreds of times between SMS communication, which is waiting for an instruction in sleep mode and becomes active for data transmission and consumes power when there is an instruction and, and IP communication, which is always active and has to keep transmitting data at high frequency for performing keepalive.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

REFERENCE SIGNS LIST 100 apparatus
101 first server
102 second server
102-1 communication unit
102-2 processing unit
102-3 storage unit
110 IoT device
111 SIM card
121 first external server
122 second external server
123 third external server

The invention claimed is:

1. An apparatus for transmitting or receiving data between an IoT device and an external server on an IP network, comprising:
    a first server receiving first signaling data including a message by signaling over a cellular network from the IoT device,
    a second server identifying a destination of the message or data corresponding to the message based on the first signaling data,
    wherein the destination is specified by a destination identifier with reference to a correspondence between destination identifiers and URLs of external servers,
    wherein the second server transmits the message or data corresponding to the message to the destination by an HTTP request over the IP network, and receives instruction data in which an instruction from an external server to the IoT device is expressed to provide the instruction data to the first server, and
    wherein the first server transmits second signaling data including the instruction data or corresponding data as a message toward the IoT device, the first server having not received data from the IoT device for a predetermined duration or a duration longer than the predetermined duration when transmitting the second signaling data.

2. The apparatus according to claim 1, wherein the destination identifier is included in the first signaling data as a part of the message.

3. The apparatus according to claim 2, wherein the destination identifier is a numeral or a symbol with predetermined digits or digits less than the predetermined digits.

4. The apparatus according to claim 1, wherein the message is in binary format.

5. The apparatus according to claim 4, wherein the second server transmits the message to the destination after decompressing the message into text format.

6. A method for transmitting or receiving between an IoT device and an external server on an IP network, comprising:
- a first server receiving first signaling data including a message by signaling over a cellular network from the IoT device, and
- a second server identifying a destination of the message or data corresponding to the message based on the first signaling data,
- wherein the destination is specified by a destination identifier with reference to a correspondence between destination identifiers and URLs of external servers,
- wherein the second server transmits the message or data corresponding to the message is transmitted to the destination by an HTTP request over the IP network, and receives instruction data in which an instruction from an external server to the IoT device is expressed to provide the instruction data to the first server, and
- wherein the first server transmits second signaling data including the instruction data or corresponding data as a message toward the IoT device, the first server having not received data from the IoT device for a predetermined duration or a duration longer than the predetermined duration when transmitting the second signaling data.

7. A non-transitory computer readable medium including instructions that, when executed by a first server and a second server, cause the first server and the second server to perform a method for transmitting or receiving between an IoT device and an external server on an IP network, the method comprising:
- the first server receiving first signaling data including a message by signaling over a cellular network from the IoT device, and
- the second server identifying a destination of the message or data corresponding to the message based on the first signaling data,
- wherein the destination is specified by a destination identifier with reference to a correspondence between destination identifiers and URLs of external servers,
- wherein the second server transmits the message or data corresponding to the message to the destination by an HTTP request over the IP network and receives instruction data in which an instruction from an external server to the IoT device is expressed to provide the instruction data to the first server, and
- wherein the first server transmits second signaling data including the instruction data or corresponding data as a message toward the IoT device, the first server having not received data from the IoT device for a predetermined duration or a duration longer than the predetermined duration when transmitting the second signaling data.

* * * * *